Figure 1:
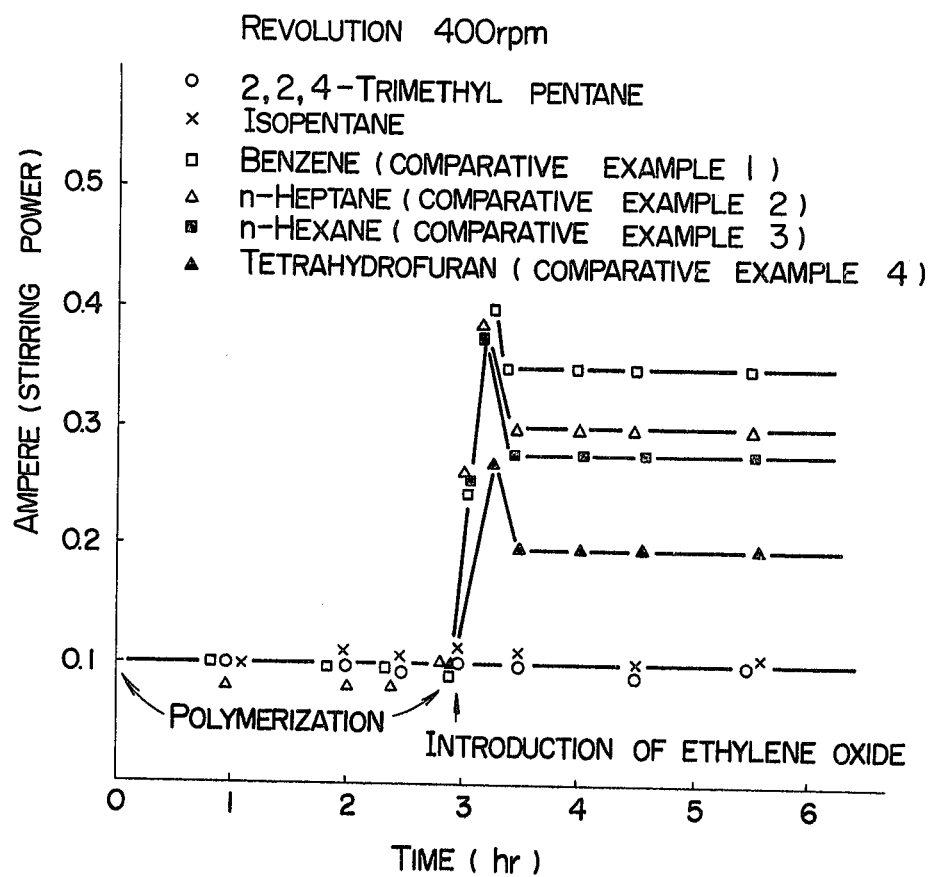

United States Patent [19]

Komatsu et al.

[11] 4,083,834
[45] Apr. 11, 1978

[54] PROCESS FOR PRODUCING POLYMER HAVING FUNCTIONAL GROUPS AT ITS CHAIN TERMINALS

[75] Inventors: Koei Komatsu, Tokyo; Akinori Nishioka, Yokohama; Noboru Ohshima, Yokohama; Masanobu Takahashi, Yokohama; Hiromichi Hara, Kawasaki, all of Japan

[73] Assignee: Japan Synthetic Rubber Co., Ltd., Tokyo, Japan

[21] Appl. No.: 605,699

[22] Filed: Aug. 18, 1975

Related U.S. Application Data

[63] Continuation-in-part of Ser. No. 441,184, Feb. 11, 1974.

[30] Foreign Application Priority Data

Feb. 12, 1973 Japan .................................. 48-17231

[51] Int. Cl.$^2$ .............................. C08F 8/08; C08F 8/34
[52] U.S. Cl. ............................... 260/79.5 NV; 526/55; 528/498
[58] Field of Search ............. 260/79.5 NV, 94.7 HA; 528/498, 55

[56] References Cited

U.S. PATENT DOCUMENTS

| | | | |
|---|---|---|---|
| 3,018,277 | 1/1962 | Wheelock | 528/498 |
| 3,274,147 | 9/1966 | Zelinski et al. | 260/41.5 |
| 3,322,738 | 5/1967 | Uraneck et al. | 260/84.7 |
| 3,538,191 | 11/1970 | Meredith et al. | 260/878 |
| 3,639,519 | 2/1972 | Hsieh et al. | 260/880 |
| 3,684,761 | 8/1972 | Stampa | 260/33.2 R |
| 3,725,369 | 4/1973 | Halasa et al. | 260/85.1 |

*Primary Examiner*—William F. Hamrock
*Attorney, Agent, or Firm*—Ladas, Parry, Von Gehr, Goldsmith & Deschamps

[57] ABSTRACT

A process for producing a polymer having functional groups at its chain terminals, which comprises reacting a polymer having alkali metal atoms at its chain terminals with an alkylene oxide or sulfide in a hydrocarbon medium having a solubility parameter of 7.2 or less at 25° C. This process makes it possible to produce the said polymer in a short period of time without necessitating a large power for agitation. According to this process, there can be produced a polymer having a functionality near the theoretical functionality in a short period of time.

21 Claims, 3 Drawing Figures

PROCESS FOR PRODUCING POLYMER HAVING FUNCTIONAL GROUPS AT ITS CHAIN TERMINALS

CROSS-REFERENCES TO RELATED APPLICATIONS

This application is a continuation-in-part of copending application Ser. No. 441,184 filed on Feb. 11, 1974.

This invention relates to a method for replacing alkali metal atoms attached to the chain terminals of a polymer having terminal alkali metal atoms with other stable functional groups. This invention relates also to a novel and useful method for producing a polymer having functional groups at its terminals.

It has heretofore been known that butadiene or a mixture of butadiene and styrene is polymerized or copolymerized by using an organo-alkali metal catalyst to synthesize a polymer having alkali metal atoms attached to its chain ends and then the reactive terminal alkali metal atoms are replaced with other functional groups. In, for example, Japanese Patent Publication No. 8190/62, there is disclosed a method for producing a terminal hydroxy unit-containing polymer which comprises polymerizing a conjugated diolefinic hydrocarbon in tetrahydrofuran or benzene in the presence of an initiator selected from the group consisting of metallic lithium and organic lithium compounds, reacting the resulting active polymer with an epoxidized monoolefinic hydrocarbon (alkylene oxide), and then contacting the resulting reaction product with a proton to produce a terminal hydroxy unit-containing polymer. However, it has also been known that when such a polymer having alkali metal atoms at its chain terminals is reacted with an alkylene oxide or an alkylene sulfide, the viscosity of the reaction system becomes extraordinarily increased. This is because the terminal group of said polymer has been converted into —OM or —SM (M being an alkali metal atom), the viscosity increase having been accounted for by D. H. Richards et al. [Chem. Ind., 45, 1473 (1958); Polymer Letters, 6, 417 (1968)] on the basis of far greater tendency of —OM or —SM to associate than that of —CM. When such association takes place among terminal groups of a polymer, the reaction system tends to assume a form of gel and becomes heterogeneous. Consequently, in order to obtain a polymer having functional groups at its chain terminals in a short period of time by restoring homogeneity within the reaction system, a large power is required for agitation.

Where the reaction is effected in tetrahydrofuran, it is necessary to carry out the reaction at low temperatures in order to prevent side-reactions of the alkali atoms at the ends of the polymer. When a conjugated diene is polymerized with a lithium-base initiator in tetrahydrofuran, the content of 1,2- or 3,4-addition units of the resulting polymer becomes large, and hence, the low temperature characteristics and the mechanical properties of articles obtained from the polymer become bad.

On the other hand, in rubber industry, polymers having functional groups at their terminal particularly, low molecular weight polymers having functional groups at both ends, are required. For instance, polybutadiene brominated at both ends, styrene-butadiene copolymer carboxylated at both ends, polybutadiene hydroxylated at both ends, etc. are used in adhesives, coating materials, rubber products, and the like. In this case, there is required a polymer whose number of functional groups per one molecule is near 2 from the viewpoint of physical properties of the final products. However, the requirements have not sufficiently been satisfied by conventional processes.

The present inventors have conducted various experiments in order to avoid the aforesaid disadvantage and, as a result, have found that this object can be satisfactorily achieved by reacting a polymer having alkali metal atoms attached to its chain terminals with an alkylene oxide or alkylene sulfide in a hydrocarbon-type poor solvent for said polymer.

An object of this invention is to provide a method for producing a polymer having functional groups at its chain terminals.

Another object of this invention is to provide a method for replacing the alkali metal atoms attached to chain terminals of a polymer having terminal alkali metal atoms with functional groups.

A further object of this invention is to provide a method for reacting a polymer having alkali metal atoms at its chain terminals with an alkylene oxide or alkylene sulfide in a short reaction time without necessitating a large power for agitation.

A still further object of this invention is to provide a process for obtaining a polymer having a functionality near the theoretical functionality (i.e., the number of terminal functional groups which one molecule can theoretically have) in a short period of time.

Other objects and advantages of this invention will become apparent from the following description.

According to this invention, there is provided a process for producing a polymer having functional groups at its chain terminals, which comprises reacting a polymer having alkali metal atoms attached to its chain ends with an alkylene oxide or alkylene sulfide in a hydrocarbon medium having a solubility parameter of 7.2 or less at 25° C.

According to the process of this invention, although gelation takes place microscopically due to association by the reaction of a polymer having alkali metal atoms at its chain terminals with an alkylene oxide or alkylene sulfide, macroscopically the reaction system is in the state of uniform dispersion without showing such gelation as extending throughout the entire system so that a terminally functional polymer may be obtained in a relatively short period of time with a very small consumption of power for agitation.

The polymers having alkali metal atoms at their chain terminals to be used in the method of this invention are preferably polymers of conjugated dienes such as 1,3-butadiene, isoprene, and 2,3-dimethylbutadiene, or copolymers of these conjugated dienes with alkenyl aromatic hydrocarbon compounds such as styrene, α-methylstyrene, vinyltoluene, and vinylnaphthalene, obtained by polymerization using alkali metals or organic alkali metal compounds as initiator. The alkali metal to be used as said initiator is chiefly lithium. The organic alkali metal compounds to be used for the same purpose are chiefly lithium compounds such as, for example, butyllithium, allyllithium, phenyllithium, 1,4-dilithiobutane, 1,5-dilithiopentane, 1,10-dilithiodecane, 1,4-dilithio-2-butene, 1,4-dilithio-2-methyl-2-butene, dilithionaphthalene, dilithiomethyl naphthalene, 1,4-dilithio-1,1,4,4-tetraphenylbutane, and bis(1-lithio-3-methylpentyl)-benzene; and tetramers to eicosamers of butadiene, 2,3-dimethylbutadiene, styrene, and α-methylstyrene, which are obtained using said lithium compounds as the initiator. The alkali metals and organic alkali metal compounds can be used as the initiator alone or in combination of 2 or more. The amount of the initiator used is preferably 1 to 1,000, more preferably 2 to 500, millimoles per 100 g of the monomer.

The hydrocarbons to be used in the process of this invention are paraffinic or olefinic hydrocarbons having a solubility parameter (square root of the cohesive energy density) of 7.2 or less at 25° C. Examples of preferred hydrocarbons are as follows, the numerical value in parentheses representing solubility parameter, i.e. square root of the cohesive energy density, at 25° C: propane (6.4), n-butane (6.7), isobutane (6.25), 1-butene (6.7), cis-2-butene (7.2), trans-2-butene (7.0), isobutene (6.7), n-pentane (7.05), isopentane (6.75), neopentane (6.25), 2,2,4-trimethylpentane (6.85), etc. These hydrocarbons are used alone or in admixture of 2 or more and in liquid state. Further, these hydrocarbons may contain other hydrocarbons than those given above, such as, for example, benzene, cyclohexane, toluene, and the like, unless the solubility parameter of the mixture exceeds 7.2 at 25° C. The hydrocarbons is preferably used in a proportion of 0.5 to 20 parts, more preferably 2 to 10 parts, by weight per part by weight of the polymer.

The polymerization reaction is preferably carried out at a temperature of 0° to 100° C., more preferably 20° to 70° C.

Typical examples of alkylene oxides or alkylene sulfides which are used to introduce the hydroxyl group or thiol group include ethylene oxide, propylene oxide, butylene oxide, styrene oxide, trimethylene oxide, ethylene sulfide, propylene sulfide, and trimethylene sulfide. These alkylene oxides and alkylene sulfides may be used in gaseous state or in dilution with the aforesaid hydrocarbons used in polymerization. The amount of an alkylene oxide or alkylene sulfide used is preferably 1 to 100, more preferably 3 to 50, moles per gram atom of the alkali metal contained in the polymer.

The reaction of a polymer having alkali metal atoms at its chain ends with an alkylene oxide or alkylene sulfide is preferably carried out at a temperature of −50° to +150° C., more preferably −30° to +70° C.

The polymer formed by reaction of polymer having alkali metal atoms at its chain ends with an alkylene oxide or alkylene sulfide can be converted to a polymer having a terminal hydroxyl groups or terminal thiol groups by reacting with an active-hydrogen-containing compound such as water, acetic acid, aqueous hydrochloric acid, or hydrogen chloride.

When a polymer having alkali metal atoms at its chain terminals is reacted with an alkylene oxide or alkylene sulfide according to the method of this invention, the dispersion of the polymer particles in the reaction system is uniform, and mechanical agitation of the system is easily carried out. Even when a dilithium compound is used as the initiator, it is possible to obtain in relatively short time a polymer having terminal hydroxyl groups or terminal thiol groups, the number of which approaches the theoretical functionality, i.e. a functionality of 2. It is further possible by proper selection of the reaction conditions to produce a terminally functional polymer having 50% or more of 1,4-configurations in its microstructure.

The process of this invention can be applied to polymers having terminal alkali metal atoms and having a very broad range of molecular weight, and the molecular weight of the polymer is not critical.

The polymers having terminal functional groups produced by the process of this invention can be used in materials for elastomers, intermediates thereof, adhesives, modifiers for resins, and the like.

The molecular weight of the polymers having terminal alkali metal atoms is properly selected according to uses, and usually, the polymers having a number-average molecular weight of 500 to 50,000 or so are used. In particular, those having a number-average molecular weight of 1,000 to 5,000 or so are suitably used.

Figure 2:
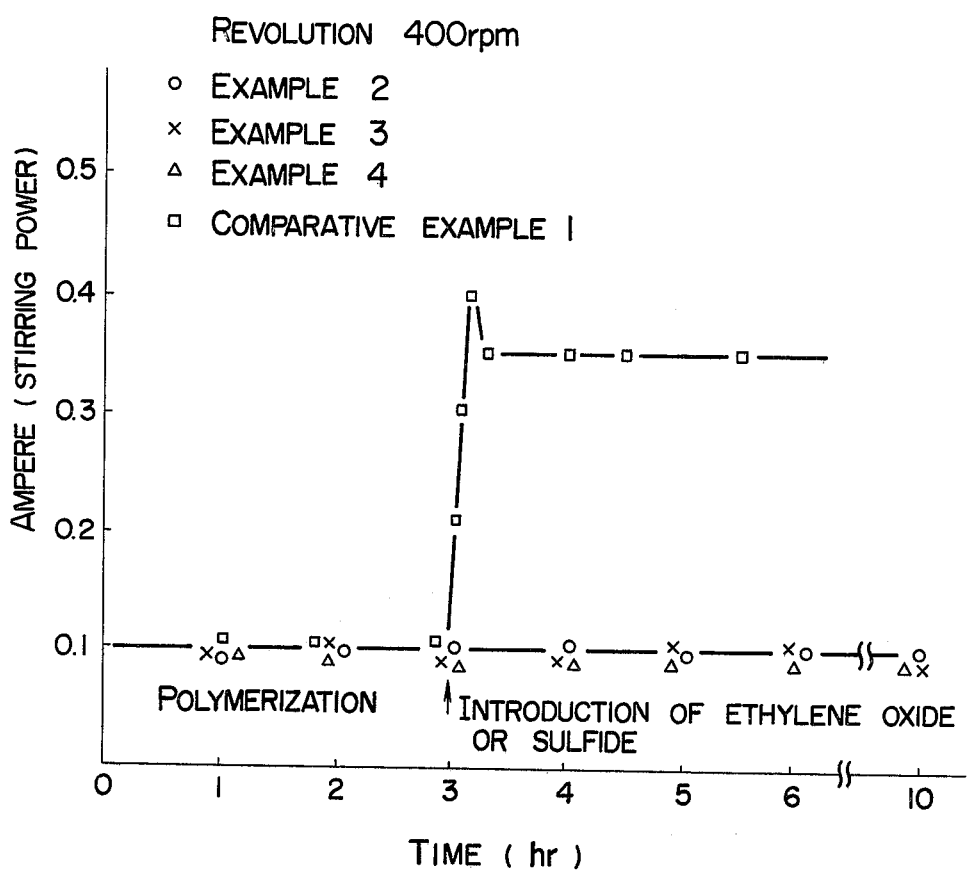
Figure 3:
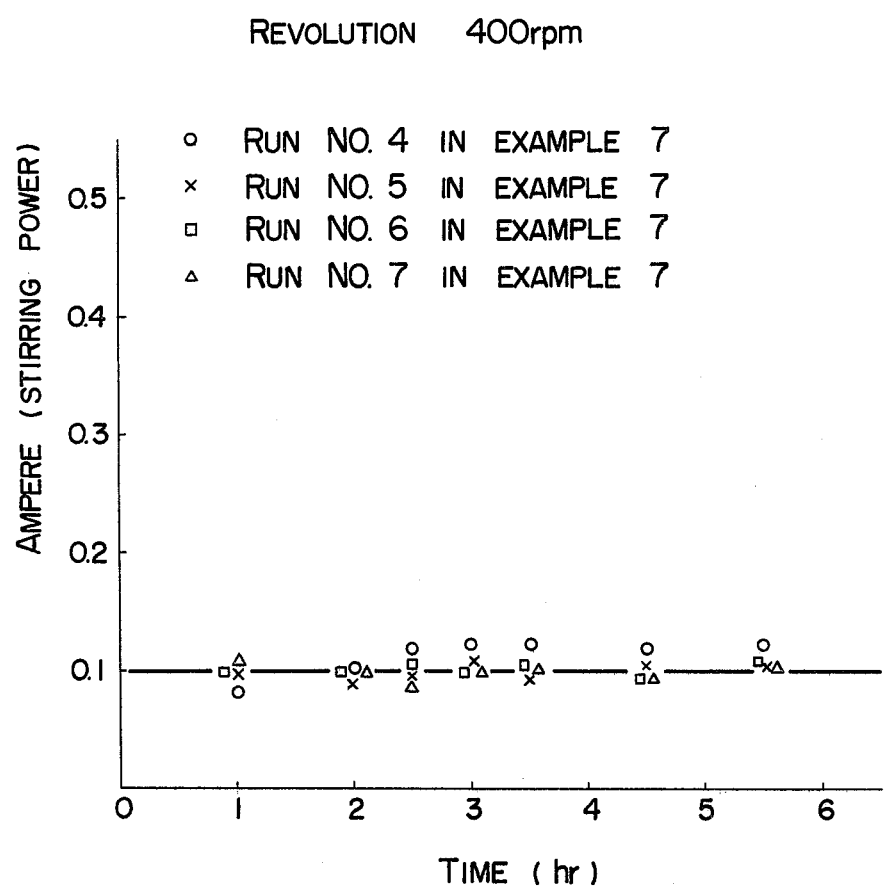

In the accompanying drawings,

FIG. 1, FIG. 2 and FIG. 3 show the effect of hydrocarbon solvents on the power required for agitation (viscosity of the reaction system) in both the present process and the comparative method.

The invention is explained below in further detail with reference to Examples which are by way of illustration and not by way of limitation.

In the Examples, the micro structure of polybutadiene was determined by the method of I. Morero (Chim. e Industria, 91, 758 (1959)) and that of polyisoprene by the method of Tanaka (J. Polymer Sci., 9, 43 (1971)). The styrene content of the polymer was determined from refractive index. The molecular weight was measured by means of a membrane osmometer and a vapor pressure osmometer.

The functional group equivalent molecular weight (molecular weight per functional group) was measured, after the polymer had been converted to a trimethylsilyl derivative, by means of NMR spectroscopy using the following equation:

$$\text{Functional group equivalent molecular weight} = (B/F/A/9) \times K + 45$$

where
A: proton area of the trimethylsilyl group,
B: total proton area of the polymer (except for the proton in trimethylsilyl group),
F: number of protons in the monomer, and
K: molecular weight of the monomer.
In the case of a copolymer, a number-average proton number and a number-average molecular weight were used for F and K, respectively, on the assumption that the polymer is a homopolymer.

EXAMPLE 1

A polybutadiene having hydroxyl groups at both chain terminals was synthesized under the conditions shown in Table 1. The experiment was conducted in the following way:

Into a 2-liter autoclave, in which the air had been replaced by argon or nitrogen free from oxygen and moisture, was charged 1 liter of a solvent which had been thoroughly dehydrated and dried. Then, the autoclave was cooled to −20° C. and charged with a predetermined amount of 1,3-butadiene, followed by a predetermined amount of 1,4-dilithiobutane (1 mole/liter). Polymerization was started by elevating the temperature inside the autoclave to 40° C. and continued for 2.5 hours while keeping the temperature at 40° to 45° C. Conversion was 100%.

After the temperature inside the autoclave had been lowered to −10° C., ethylene oxide diluted with 200 ml of the same solvent as the polymerization medium was introduced into the autoclave and allowed to react for a predetermined period of time.

Stirring was continued during the polymerization and after introduction of ethylene oxide. The power required for stirring the autoclave was recorded by means of an ampere meter connected to the stirring device.

The polymer which was formed was precipitated by pouring it into 10 liters of methanol containing 10 ml of water and 10 ml of concentrated hydrochloric acid. The precipitates were further washed three times with 2 liters of methanol and dried at 60° C. for 48 hours. The results obtained were as shown in Table 2 and FIG. 1.

From FIG. 1, it is seen that when a polybutadiene having lithium at both terminals of its chain is reacted with ethylene oxide, the power required for stirring is very small in hydrocarbons having a solubility parameter of 7.2 or less (2,2,4-trimethylpentane in Run No. 1 and Run No. 3 and isopentane in Run No. 2).

It is also seen from Table 2 that a polybutadiene having terminal hydroxyl groups, the number of which corresponds to a functionality of nearly 2, can be obtained in relatively short period of time.

Moreover, since the polymer which was formed has a 1,2-vinyl unit content of less than 50%, it is excellent also as the material for an elastomer.

Table 1

| Run No. | 1,4-Dilithiobutane (mmole) | 1,3-Butadiene (g) | Solvent (one liter) | Ethylene oxide (g) |
|---|---|---|---|---|
| 1 | 15 | 150 | 2,2,4-Trimethyl-pentane (6.85) | 6.6 |
| 2 | 15 | 150 | Isopentane (6.75) | 6.6 |
| 3 | 150 | 150 | 2,2,4-Trimethyl-pentane | 66.0 |
| Comparative Ex. | | | | |
| 1 | 15 | 150 | Benzene (9.15) | 6.6 |
| 2 | 15 | 150 | n-Heptane (7.45) | 6.6 |
| 3 | 15 | 150 | n-Hexane (7.3) | 6.6 |
| 4 | 15 | 150 | Tetrahydrofuran (9.1) | 6.6 |

Note:
1. 1,4-Dilithiobutane was used as solution in ether (1 mole/liter).
2. Ethylene oxide was used after having been diluted with 200 ml of the same solvent as the polymerization medium.
3. Numerical values in parenthesis show the solubility parameters at 25° C.
4. In Comparative Example 4, the polymerization temperature was −30° C.

Table 2

| Run No. | Reaction time of ethylene oxide(hr.) | Molecular weight | Hydroxyl group equivalent molecular weight | Functionality | Micro structure (%) | | |
|---|---|---|---|---|---|---|---|
| | | | | | cis-1,4 | trans-1,4 | -,2-vinyl |
| 1 | 0.5 | 9,500 | 6,800 | 1.4 | 24 | 41 | 35 |
| | 1.0 | 9,500 | 5,600 | 1.7 | 24 | 41 | 35 |
| | 5.0 | 9,500 | 5,000 | 1.9 | 24 | 41 | 35 |
| 2 | 5.0 | 9,500 | 5,020 | 1.9 | 25 | 41 | 34 |
| 3 | 5.0 | 4,160 | 2,190 | 1.9 | 18 | 35 | 47 |
| Comparative Ex. | | | | | | | |
| 1 | 0.5 | 10,800 | 15,500 | 0.7 | 24 | 41 | 35 |
| | 1.0 | 10,800 | 8,320 | 1.3 | 24 | 41 | 35 |
| | 5.0 | 10,800 | 6,750 | 1.6 | 24 | 41 | 35 |
| 2 | 5.0 | 10,100 | 5,940 | 1.7 | 25 | 41 | 34 |
| 3 | 5.0 | 9,950 | 5,800 | 1.7 | 25 | 42 | 33 |
| 4 | 5.0 | 10,200 | 6,000 | 1.7 | 2 | 8 | 90 |

Note:
1. Functionality = (Molecular weight) / (Hydroxyl group equivalent molecular weight)

EXAMPLE 2

The same procedure as in Example 1 (Run No. 1) was repeated except that isoprene was used in place of 1,3-butadiene (reaction time of ethylene oxide was 7 hours).

As is apparent from the results shown in FIG. 2, the power required for stirring did not increase even after the introduction of ethylene oxide.

There was obtained a hydroxypolyisoprene having a molecular weight of 37,000 and a functionality of 1.9; its micro structure contained 77% of 1,4-(cis + trans) configuration and 23% of 3,4-configuration.

EXAMPLE 3

The same procedure as in Example 1 (Run No. 1) was repeated except that 37.5 g of styrene and 112.5 g of 1,3-butadiene were used as monomers in place of 1,3-butadiene and 37.5 mmoles of 1,4-dilithiobutane was used (the reaction time of ethylene oxide was 7 hours).

As is apparent from the results shown in FIG. 2, the power required for stirring did not increase even after the introduction of ethylene oxide.

There was obtained a hydroxy-styrene-butadiene copolymer having a molecular weight of 4,420, a functionality of 1.8, and a styrene content of 26%.

EXAMPLE 4

The same procedure as in Example 1 (Run No. 1) was repeated except that 9 g of ethylene sulfide was used in place of ethylene oxide (the reaction time of ethylene sulfide was 7 hours).

As is seen from the results shown in FIG. 2, the power required for stirring did not increase even after the introduction of ethylene sulfide.

There was obtained a thiol-terminated polybutadiene having a molecular weight of 10,300 and a functionality of 1.8.

EXAMPLE 5

The same procedure as in Example 1 was repeated, except that n-pentane (solubility parameter at 25° C: 7.05) was used as the polymerization medium, to polymerize butadiene.

The autoclave was cooled to an inside temperature of 10° C, after which 6.6 g of ethylene oxide diluted with 100 ml of n-heptane (solubility parameter at 25° C: 7.45) was introduced into the autoclave and then subjected to reaction for 5 hrs.

The power required for stirring during the polymerization and after the introduction of ethylene oxide was substantially the same as in Run Nos. 1 and 2 in Example 1.

There was obtained hydroxypolybutadiene having a molecular weight of 9,740, a hydroxy group equivalent molecular weight of 4,920, a functionality of 1.97, a cis-1,4 configuration content of 24%, a trans-1,4 configuration content of 41% and a 1,2-configuration content of 35%.

EXAMPLE 6

The same procedure as in Example 5 was repeated, except that 2,2,4-trimethylpentane was used as the polymerization medium and the reaction with ethylene oxide was effected at 0° C, to obtain hydroxypolybutadiene having a molecular weight of 10,200, a hydroxyl group equivalent molecular weight of 5,300 and a functionality of 1.93.

The power required for stirring during the polymerization and after the introduction of ethylene oxide was substantially the same as in Run No. 1 in Example 1.

EXAMPLE 7

A polybutadiene having hydroxyl groups at both chain terminals was synthesized under the conditions shown in Table 3.

precipitates were further washed three times with 2 liters of methanol and dried at 60° C for 48 hours.

The results obtained were as shown in Table 4.

Table 4

| Run No. | Reaction time of ethylene oxide (hr.) | Molecular weight | Hydroxyl group equivalent molecular weight | Functionality | Micro structure (%) | | |
|---|---|---|---|---|---|---|---|
| | | | | | cis-1,4 | trans-1,4 | 1,2-vinyl |
| 4 | 5 | 45160 | 23470 | 1.9 | 25 | 42 | 33 |
| 5 | 5 | 3240 | 1660 | 2.0 | 22 | 39 | 39 |
| 6 | 5 | 1320 | 680 | 1.9 | 20 | 32 | 48 |
| 7 | 5 | 530 | 270 | 2.0 | 20 | 31 | 49 |

Note:
Functionality = (Molecular weight)/(Hydroxyl group equivalent molecular weight)

From FIG. 3, it is seen that when a polybutadiene having lithium at both terminals of its chain is reacted with ethylene oxide, the power required for stirring is very small in 2,2,4-trimethylpentane.

It is also seen from Table 4 that a polybutadiene having terminal hydroxyl groups, the number of which corresponds to a functionality of nearly 2, can be obtained in a relatively short period of time.

Moreover, since the polymer formed has a 1,2-vinyl unit content of less than 50%, it is excellent also as the material for an elastomer.

What is claimed is:

1. A process for producing a conjugated diene polymer having functional groups at its chain terminals, Table 3

| Run No. | Initiator[1] (millimole) | | 1,3-Butadiene (g) | Solvent (liter) | | Ethylene oxide[2] (g) |
|---|---|---|---|---|---|---|
| 4 | 1,4-dilithiobutane | 3.5 | 150 | 2,2,4-trimethyl pentane | 1.4 | 3.2 |
| 5 | α,ω-dilithio(butadiene heptamer) | 50 | 150 | " | 1.0 | 22.0 |
| 6 | " | 150 | 150 | " | 1.0 | 66.0 |
| 7 | " | 350 | 150 | " | 1.0 | 156 |

Note:
1) α,ω-dilithio(butadiene heptamer) was used in the form of a solution in ether (1 mole/liter).
2) Ethyiene oxide was used after having been diluted with 200 ml of the same solvent as the polymerization medium.

The experiment was conducted in the following way:

Into a 2-liter autoclave, in which the air had been replaced by argon or nitrogen free from oxygen and moisture, was charged 1 liter of a solvent which had been thoroughly dehydrated and dried. Then, the autoclave was cooled to −20° C and charged with a predetermined amount of 1,3-butadiene, followed by a predetermined amount of 1,4-dilithiobutane or α,ω-dilithio (butadiene heptamer) (1 mole/liter). Polymerization was started by elevating the temperature inside the autoclave to 40° C and continued for 2.5 hours while keeping the temperature at 40° to 45° C. Conversion was 100%.

After the temperature inside the autoclave had been lowered to −10° C, ethylene oxide diluted with 200 ml of the same solvent as the polymerization medium was introduced into the autoclave and allowed to react for a period of time as shown in Table 4.

Stirring was continued during the polymerization and after introduction of ethylene oxide. The power required for stirring the autoclave was recorded by means of an ampere meter connected to the stirring device to obtain the results shown in FIG. 3.

The polymer which was formed was precipitated by pouring it into 10 liters of methanol containing 10 ml of water and 10 ml of concentrated hydrochloric acid. The prepared by polymerization of at least one conjugated diene, with or without an alkenylaromatic monomer, in the presence of lithium metal or a dilithioorganic compound at a temperature of 0° to 100° C., to form a base polymer having lithium metal atoms at its chain terminals and reacting same with an alkylene oxide or alkylene sulfide, characterized in that the reaction of the base polymer and alkylene oxide or sulfide is effected in a hydrocarbon medium in which the modified polymer is insoluble, said medium having a solubility parameter of 7.2 or less at 25° C.

2. A process according to claim 1, wherein the polymer has a number-average molecular weight of 500 to 50,000.

3. A process according to claim 1, wherein the hydrocarbon is selected from the group consisting of paraffinic or olefinic hydrocarbons having a solubility parameter of 7.2 or lower at 25° C.

4. A process according to claim 1, wherein the hydrocarbon is selected from the group consisting of propane, n-butane, isobutane, 1-butene, cis-2-butene, trans-2-butene, isobutene, n-pentane, isopentane, neopentane, and 2,2,4-trimethylpentane.

5. A process according to claim 1, wherein the amount of the hydrocarbon is 0.5 to 20 parts by weight per part by weight of the polymer.

6. A process according to claim 1, wherein the amount of the hydrocarbon is 2 to 10 parts by weight per part by weight of polymer.

7. The process according to claim 1, wherein the hydrocarbon is 2,2,4-trimethylpentane or isopentane.

8. A process according to claim 1, wherein the polymer having lithium metal atoms at its chain terminals is a polymer or copolymer obtained by polymerization of at least one conjugated diene or a mixture of a conjugated diene and an alkenyl aromatic compound by use of an lithium metal or an organic lithium metal compound as initiator.

9. A process according to claim 8, wherein the intiator is at least one member selected from the group consisting of lithium, butyllithium, allyllithium, phenyllithium, 1,4-dilithiobutane, 1,5-dilithiopentane, 1,10-dilithiodecane, 1,4-dilithio-2-butene, 1,4-dilithio-2-methyl-2-butene, dilithionaphthalene, dilithiomethylnaphthalene, 1,4-dilithio-1,1,4,4-tetraphenylbutane, and bis(1-lithio-3-methylpentyl)benzene.

10. A process according to claim 8, wherein the initiator is 1,4-dilithiobutane.

11. A process according to claim 8, wherein at least one conjugated diene selected from the group consisting of 1,3-butadiene, isoprene, and 2,3-dimethylbutadiene is polymerized.

12. A process according to claim 8, wherein a mixture of a conjugated diene selected from the group consisting of 1,3-butadiene, isoprene, and 2,3-dimethylbutadiene; and an alkenyl aromatic hydrocarbon compound selected from the group consisting of styrene, α-methylstyrene, vinyltoluene, and vinylnaphthalene is polymerized.

13. A process according to claim 8, wherein 1,3-butadiene or isoprene or a mixture of 1,3-butadiene and styrene is polymerized.

14. A process according to claim 8, wherein the amount of the initiator is 1 to 1,000 millimoles per 100 g of a conjugated diene or a mixture of a conjugated diene and an alkenyl aromatic hydrocarbon compound.

15. A process according to claim 1, wherein the alkylene oxide or the alkylene sulfide is selected from the group consisting of ethylene oxide, propylene oxide, butylene oxide, styrene oxide, trimethylene oxide, ethylene sulfide, propylene sulfide, and trimethylene sulfide.

16. A process according to claim 1, wherein the alkylene oxide or the alkylene sulfide is ethylene oxide or ethylene sulfide.

17. A process according to claim 1, wherein the amount of the alkylene oxide or the alkylene sulfide is 1 to 100 moles per gram atom of the lithium metal contained in the polymer.

18. A process according to claim 1, wherein the amount of the alkylene oxide or the alkylene sulfide is 3 to 50 moles per gram atom of the lithium metal contained in the polymer.

19. A process according to claim 9, wherein the polymerization is carried out at a temperature of 0° to 100° C.

20. A process according to claim 1, wherein the reaction is carried out at a temperature of −50° to +150° C.

21. A process according to claim 1, wherein the reaction is carried out at a temperature of −30° to +70° C.

* * * * *